(No Model.)

E. C. HERNANDEZ.
VELOCIPEDE.

No. 360,017. Patented Mar. 29, 1887.

Witnesses.
E. Blanta.
O. M. Shaw.

Inventor.
Eleuterio C. Hernandez
Per C. C. Shaw.
Attorney.

UNITED STATES PATENT OFFICE.

ELEUTERIO C. HERNANDEZ, OF BOSTON, MASSACHUSETTS.

VELOCIPEDE.

SPECIFICATION forming part of Letters Patent No. 360,017, dated March 29, 1887.

Application filed October 15, 1886. Serial No. 216,316. (No model.)

*To all whom it may concern:*

Be it known that I, ELEUTERIO C. HERNANDEZ, of Boston, in the county of Suffolk, State of Massachusetts, have invented a certain new and useful Improvement in Bicycles, of which the following is a description sufficiently full, clear, and exact to enable any person skilled in the art or science to which said invention appertains to make and use the same, reference being had to the accompanying drawings, forming part of this specification, in which—

Figure 1:
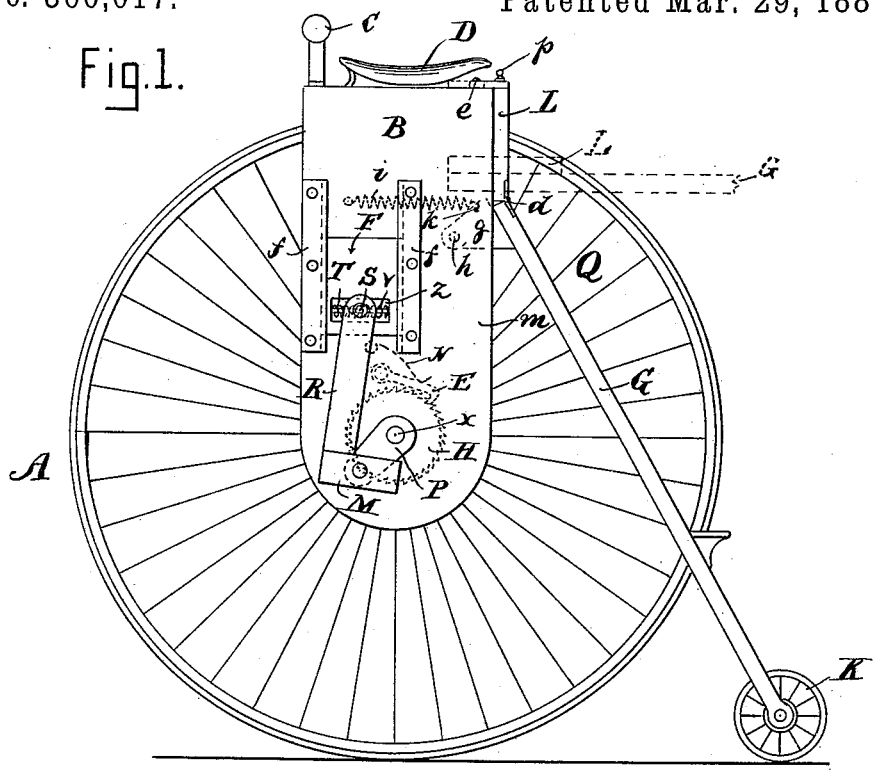
Figure 2:
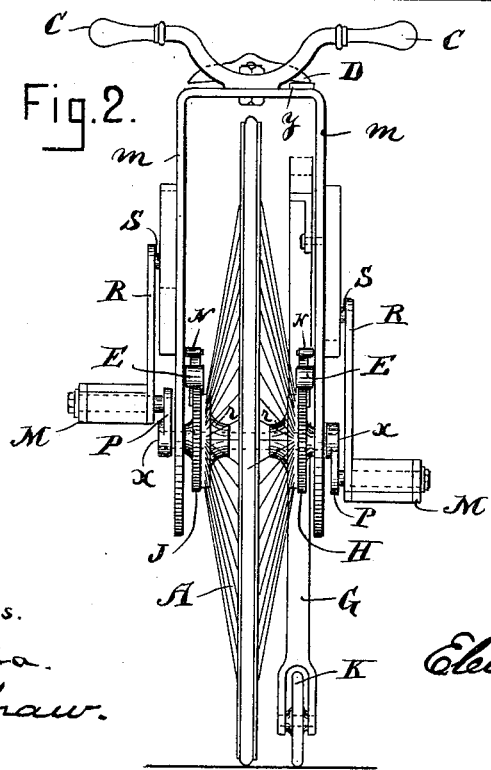

Figure 1 is a side elevation of my improved bicycle, and Fig. 2 a front elevation of the same.

Like letters of reference indicate corresponding parts in the different figures of the drawings.

My invention relates more especially to that class of bicycles which are adapted to be converted into unicycles; and it consists in a novel construction and arrangement of parts, as hereinafter more fully set forth and claimed, the object being to produce a simpler and more effective device of this character than is now in ordinary use.

The nature and operation of the improvement will be readily understood by all conversant with such matters from the following explanation:

In the drawings, A represents the main or drive wheel, and B the body of the bicycle.

The body B consists of two broad upright standards, m m, disposed on the axle x, and connected at their tops by a cross-bar, y, the seat D and handles C being secured to said cross-bar.

The wheel A is secured on an axle, x, which is journaled horizontally in the lower ends of the standards m. Mounted on the axle x, between the hubs r and standards m m, and secured to said axle, are ratchet-wheels H J, and pivoted on the inner faces of said standards are retaining-pawls E, adapted to engage said ratchet-wheels, said pawls being held in position by springs N. The wheels H J are arranged on the axle x in such a manner that the teeth of the wheel H shall alternate with the teeth of the wheel J, or so that when the machine is in motion the teeth of one of said wheels will be engaged by its pawl while the pawl of the other is out of action, or not engaged, thereby preventing the driving-wheel from turning backward.

Pedals M are journaled on crank-shafts P, which are disposed on the ends of the axle x, in the usual manner, and rigidly connected to said pedals there are upright standards R. In the upper ends of the standards R are disposed bolts S, the inner ends of which are adapted to travel on horizontally-arranged rods T, around which are disposed coiled springs v, said rods being secured in slots z cut in slides F, which are adapted to travel in vertically-arranged ways or guides f f, secured to the standards m m.

The object of the standards R is to retain the pedals in a horizontal position, the coiled spring v yielding sufficiently to permit a slight lateral play or motion to said standards, thus preventing the pedals being caught "on the center" when the machine is in use.

The backbone Q of the bicycle consists of two arms, G L, hinged at d. The hind wheel, K, is disposed in the usual manner in the lower end of the long arm G, and the upper end of said arm is secured to a triangular-shaped block, g, which is pivoted at h on the inner side of one of the standards m. A spiral spring, i, is fastened at one end to the inner side of said standard m, and has its other end secured at k to the upper side of the block g, the object of said spring being to retain the backbone in a horizontal position when it is desired to run the machine as a unicycle. The short arm L of the backbone has its upper end resting against the cross-bar y, and is held in position by a button, p, pivoted at e to said cross-bar.

In the use of my improvement, when it is desired to convert the bicycle into a unicycle, the button p is turned, releasing the short arm L of the backbone, which falls down onto the long arm G, thereby permitting the spring i to elevate the arms, as shown by the dotted lines G L. By means of the ratchet-wheels J H, which prevent the wheel A from turning back, the pedals M being retained in a horizontal position by the standards R, and affording a steady foothold, the rider is enabled to maintain a vertical position above the axle x when the machine is used as a unicycle.

I do not confine myself to making the body

B of one broad standard m on either side of the wheel A, as two or more smaller standards may be used; nor to disposing the ways or runs f for the slide F upon said standards, as where two or more standards are used they may be made to serve the purpose of said slides. Neither do I confine myself to making the ratchet-wheels H J of the same size, as one may be made small with coarse teeth and the other large with fine teeth, and serve the same purpose.

Having thus explained my invention, what I claim is—

1. In a bicycle, the combination of the following instrumentalities, to wit: a main driving-wheel provided with an axle, to which it is rigidly attached, a body mounted on said axle and provided with handles and a seat for the rider, a ratchet mechanism for preventing the wheel from turning backward, a crank rigidly attached to either end of said axle, a pedal mounted on the wrist-pin of each of said cranks and provided with an upwardly-projecting standard for keeping the pedal in a horizontal position, or nearly so, a slide pivoted to the upper end of each of said standards and adapted to work vertically on said body, a spring connected with each of said standards and adapted to yield to permit the cranks to "pass the center," and a backbone or arm provided with a trundle-wheel at its lower end and adapted to be elevated and secured in an elevated position to convert the bicycle into a unicycle, substantially as described.

2. In a bicycle, the arm G, provided with the wheel K and secured to the block g, and the arm L, hinged to the upper end of the arm G, the block g being pivoted to the body B and provided with the spring i, for holding the arm G in an elevated position, and said body provided with the button p, adapted to engage the short arm L and keep the arm G depressed, substantially as set forth.

3. In a bicycle, the slide F, fitted to work in the ways f on the body B, and provided with the rod T and spring v, in combination with the pedal M, provided with the rigid standard R, having the bolt S, substantially as described.

4. In a bicycle, the ratchet-wheels H J, provided with the pawls E, in combination with the wheel A and body B, said ratchet-wheels being arranged in such a manner that the spaces between the teeth of one of said wheels will stand opposite the teeth in the other, substantially as and for the purpose set forth.

ELEUTERIO C. HERNANDEZ.

Witnesses:
  O. M. SHAW,
  E. L. SAWYER.